United States Patent [19]

Valyi

[11] Patent Number: 5,082,604
[45] Date of Patent: Jan. 21, 1992

[54] EXTRUSION OF PLASTICS

[76] Inventor: Emery I. Valyi, 19 Moseman Ave., Katonah, N.Y. 10536

[21] Appl. No.: 615,251

[22] Filed: Nov. 19, 1990

[51] Int. Cl.$^5$ ............... B29C 45/00; B29C 45/40; B29C 45/56; B29C 45/57
[52] U.S. Cl. ............... 264/40.5; 264/328.7; 264/334; 264/500; 425/149; 425/555; 425/556
[58] Field of Search ............ 264/40.5, 328.7, 328.16, 264/334, 335, 500; 425/149, 437, 444, 555, 556

[56] References Cited

U.S. PATENT DOCUMENTS

| | | | |
|---|---|---|---|
| 2,781,547 | 2/1957 | Moxness | 264/328.7 X |
| 3,670,066 | 6/1972 | Valyi | 264/40.5 X |
| 4,948,547 | 8/1990 | Hendry | 264/500 |

*Primary Examiner*—Leo B. Tentoni
*Attorney, Agent, or Firm*—Bachman & LaPointe

[57] ABSTRACT

A method and apparatus for the molding of a thermoplastic with a large cross-section is provided. The plastic is extruded into a closed mold where sufficient pressure is maintained on the plastic to offset the shrinkage to the extrudate during cooling. In particular, the mold cavity is capable of changing its volume as molten plastic is forced into it while also changing the pressure within it against which the plastic is being extruded. This is achieved by positioning a movable piston as one end of the mold, and applying pressure to the piston so that a predetermined pressure within the mold is maintained. Once the desired amount of plastic is within the cavity, pressure is maintained while it solidifies, following which the finished product is ejected.

12 Claims, 1 Drawing Sheet

EXTRUSION OF PLASTICS

BACKGROUND OF THE INVENTION

1. Field of the Invention

This invention relates to the extrusion of plastics, and more specifically to a method and apparatus for extruding bulky articles of thermoplastic while avoiding defects due to shrinkage.

2. Description of the Prior Art

As plastic products have become more widespread throughout society, extrusion methods have become an important technique for their industrial production. Ordinarily, plastics are extruded by passing heated, formable plastic articles through a die, and then allowing the extrudate to cool in a fluid. Such conventional extrusion of plastics is cumbersome and difficult to carry out free of defects whenever the cross-section of the extruded product is large. This is due to the differences in cooling rates between cross-sectional regions of the product. For example, the plastic is slowest to solidify at the centerline of the extrudate and as a result voids tend to appear due to shrinkage during the cooling process causing defects in the resulting product. In the production of polyethylene bars with a diameter of 50mm or more, for example, due to the poor heat conductivity of the plastic, the center region of the extrudate cools very slowly even if the outside surface is vigorously cooled. It is thus near impossible to avoid the formation of shrinkage defects near the centerline.

SUMMARY OF THE INVENTION

The object of the present invention is to provide a method and apparatus to efficiently produce articles of plastic, with large, mostly uniform cross-sections, while avoiding defects due to shrinkage, particularly at the centerline.

The foregoing object is achieved by the extrusion system of the present invention.

In accordance with the present invention, a method and apparatus are provided for the extrusion of thermoplastics with reduced defects due to shrinkage. In the system of the present invention, the plastic is extruded into a closed mold, in contrast to the usual method of extruding through a die into free air. Within the closed mold, sufficient pressure is maintained on the plastic to offset the shrinkage of the extrudate during cooling. In particular, the mold cavity is capable of changing its volume as molten plastic is forced into it, while also changing the pressure against which the plastic is being extruded. This is achieved by positioning a movable piston as one end of the mold, and applying pressure to the piston so that a predetermined pressure within the mold is maintained. Once the desired amount of plastic is within the cavity, pressure is maintained while it solidifies, following which the finished product is ejected, also using the piston.

Consequently, the method and apparatus of the present invention provides a means to overcome the shrinkage effects which occur during the molding of thermoplastics which have a large cross-section. As a result, the quality of the product is improved at lower cost than previously possible.

BRIEF DESCRIPTION OF THE DRAWINGS

The present invention will be more readily understandable from a consideration of the accompanying partly schematic drawings in which specific embodiments have been shown for the purposes of illustration.

In the drawings.

DESCRIPTION OF THE PREFERRED EMBODIMENT

Figure 1:
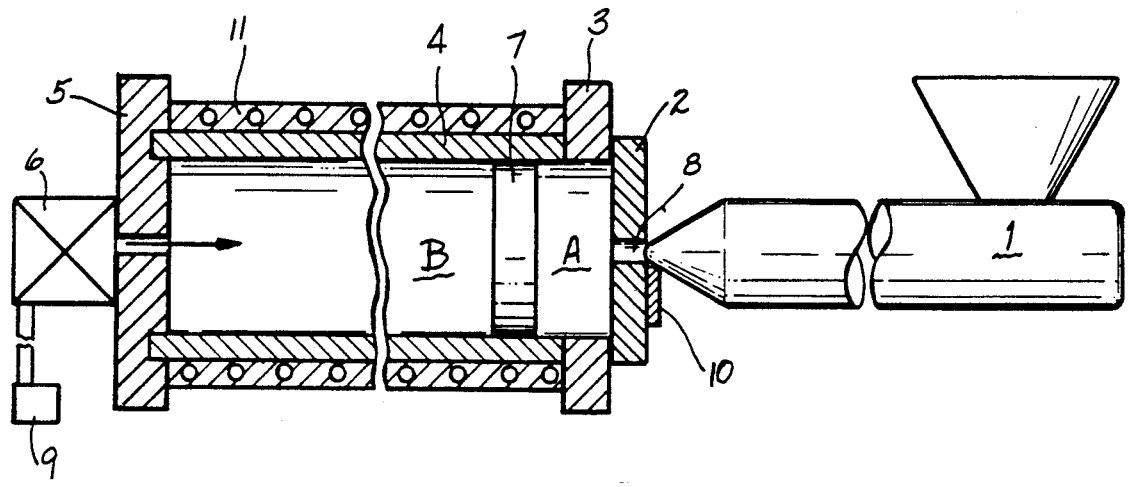
FIG. 1 illustrates a front view of the plastic extrusion system of the present invention.

As shown in the drawings, the system of the present invention is provided with extruder 1 to melt the plastic and to convey it at the necessary pressure into tube 4 which serves as the mold. The plastic being molded may be any common thermoplastic, such as, for example, polyolefins, polyarylates, styrenic resins, aramids, and combinations thereof, or any thermoplastic which exhibits a shrinking effect during cooling after molding.

Extruder 1 may be any conventional extruder of the type ordinarily used within the plastics industry which provides molten plastic under pressure. It may be the type equipped with a reciprocating screw, or it may be of the two stage variety in which plasticating is provided by a screw which feeds into a ram-extruder that then provides the necessary pressure.

The extruder 1 abuts plate 2, which serves as an end to the mold. Plate 2 has a channel extending therethrough, i.e., a gate 8 through which the plastic enters tube 4 at low viscosity, and under pressure. Gate 8 may be sealingly closed when extrusion is complete by any suitable conventional valve, as by schematically shown valve 10 which may slidingly seal gate 8.

Tube 4 is closed at its ends by plates 3 and 5, and contains a closely fitting movable piston 7. Appropriate motive means (not shown) are provided for piston 7. The inner wall of tube 4 is finished so as to allow piston 7 to reciprocate within it with the minimal friction, and to guide the piston 7 to avoid binding or misalignment. Piston 7 separates tube 4 into chambers A and B. Chamber B is formed at its ends by piston 7 and end plate 5, and circumferentially by the walls of tube 4. Chamber A is formed at its ends by piston 7 and end plate 3, and circumferentially by tube 4.

Plates 3 and 5 each contain an orifice extending through to the inside of the tube 4. Through the orifice in end plate 5, tube 4 communicates with a fluid-pressure control valve 6 which is itself connected to an external source of fluid pressure 9, wherein the fluid may for example be ambient air. This pressure source 9 may be any suitable type. Thus, when valve 6 is opened, chamber B will be exposed to the pressure of the external pressure supply. Likewise, when orifice 8 is opened, chamber A is exposed to pressurized thermoplastic.

As the pressure in chambers A and B change, piston 7 will be caused to move within tube 4. For example, piston 7 will move towards end 3 if the pressure in chamber B is greater than in chamber A, and vice versa. As piston 7 moves, the pressure in the chambers will vary inversely proportional to the change in volume. Once the pressures in chambers A and B are the same, piston 7 will not move.

Figure 2:
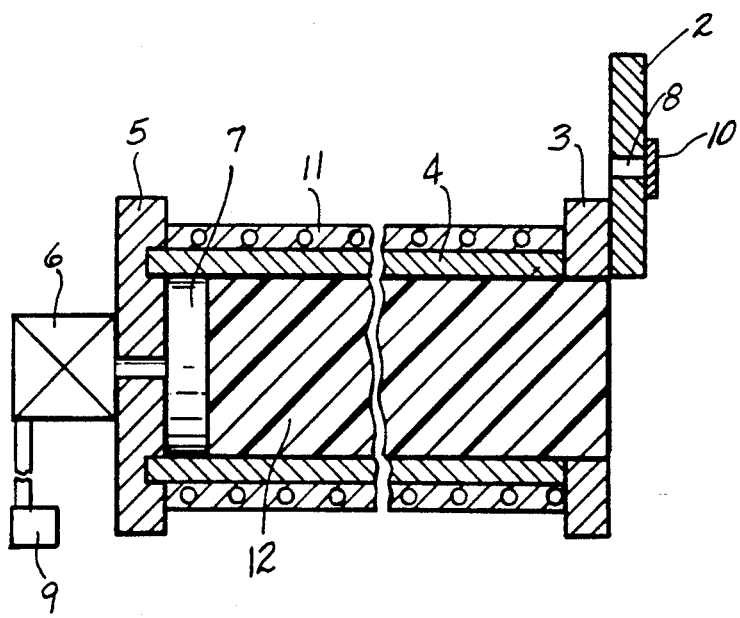
FIG. 2 illustrates a view similar to FIG. 1 with the extruder removed, tube filled with extrudate and tube cover open.

The process of the invention is carried out by forcing molten plastic under pressure into tube 4 from the extruder through gate 8. At the start of this cycle, piston 7 is at or very near plate 2, usually resting against it. While extrusion is in progress, a predetermined constant or a predetermined varying pressure is maintained in chamber B. The pressure in chamber B is controlled by opening or closing valve 6, thus applying pressure to piston 7 and forcing its movement. If the pressure fluid, usually air, or an inert gas, such as, for example, nitrogen, is trapped in chamber B by shutting valve 6, the pressure in chamber B will increase in proportion with the volume of plastic entering chamber A. Having previously determined what pressure must be maintained upon the plastic as it solidifies in order to avoid uncontrolled shrinkage, the pressure in chamber B is regulated accordingly. Once the desired volume of plastic is extruded into chamber A and an extruded plastic article formed as shown in FIG. 2 by article 12, gate 8 is closed, as by a conventional valve and the tube 4 subjected to vigorous cooling, by conventional means, as by cooling jacket 11. As the plastic cools within tube 4, its volume decreases and therefore the pressure in chamber B decreases in proportion. To maintain sufficient pressure, fluid pressure may be increased from the external pressure source through valve 6. Alternatively, it may be simpler to set the pressure in chamber B at the time of completion of the extrusion higher by that amount which will result in the desired holding pressure after the volume decrease in chamber A occurs. The pressure to which chamber B must be pre-pressurized may be determined either by experimentation, or by calculation of the expected shrinkage of the extrudate in chamber A.

For example, ambient pressure (1 bar) is maintained in chamber B at the start of a cycle. The pressure exerted by the extruder is 1000 bar. A rod of 100,000mm$^3$ is to be made, having a cross-section of 100mm$^2$. Chamber A at the start of extrusion is of nominal length, perhaps 1mm in the axial direction. Upon extruding the full volume, the pressure in both chambers A and B will be approximately 1000 bar, trapped in chamber A by closing gate 8, and in chamber B, by keeping valve 6 closed. The entire assembly, including the plastic within tube 4 is now cooled until the rod may be ejected therefrom. During cooling the volume in chamber A will decrease due to shrinkage and therefore so will the fluid pressure in chamber B. However, for the example given the reduced pressure will still suffice to offset major shrinkage voids. Of course, if necessary supplemental pressure source 9 may be used to adjust the pressure in chamber B.

The ejection process is accomplished by removing end plate 2 as shown schematically in FIG. 2, and increasing the pressure in chamber B by opening valve 6. The opening and closing of end plate 2 may be accomplished by any known convenient means. Piston 7 would then forcefully eject the molded plastic from tube 4 through the open end.

Cooling is best carried out by circulating water around tube 4 as in cooling jacket 11 or through channels in its wall, or by contact with its outer surface. If the latter, the contact area may be increased by providing fins thereon.

The cooling time after extrusion may take a long time to be performed correctly, taking much longer that the extrusion itself, depending on the thickness of the product. In order to use the extruder more efficiently, the tube assembly 4 may be removed from the extruder after having been filled with the molten plastic, and another like assembly may be attached to the extruder so that the extrusion and cooling cycles overlap. For example, the filled tube assembly may simply be transported to a cooling station by means known in the art, or a rotatable assembly provided with a plurality of tube assemblies so that filled tube assemblies may simply be rotated for cooling.

While in the preferred embodiment fluid is used to apply pressure to the piston 7, it is foreseen that other means, such as a mechanical system may be as effective at applying pressure to the molding chamber. Additionally, the present invention may be equally useful for the molding of thermoplastics which do not have large cross-sections.

Although the invention has been described in detail with respect to certain embodiments and examples, variations and modifications exist which ar within the scope of the invention as defined in the following claims.

What is claimed is:

1. An apparatus for the extrusion of rod-like thermoplastics, which comprises:
   a hollow sold having a pre-defined shape and defining a hollow space therein, said space formed by mold walls and opposing ends;
   a reciprocable piston fittingly located entirely within said space and separating said space into a first and second chamber;
   said first chamber forming a mold cavity defined by said mold walls, a side of said piston and an end of said mold;
   said second chamber defined by said mold walls, the opposite end of said mold and the other side of said piston;
   means for injecting a molten thermoplastic into said first chamber; and
   means for maintaining predetermined pressure in said first chamber until said molten thermoplastic has solidified by moving said piston in said space.

2. Apparatus according to claim 1 wherein said means for maintaining predetermined pressure in said first chamber comprises means for injecting fluid pressure into said second chamber.

3. Apparatus according to claim 2 wherein said first and second chambers have a variable size depending on the position of said piston in said space.

4. Apparatus according to claim 2 wherein said means for maintaining includes a supply of pressurized fluid communicating with said second chamber and means for regulating said supply.

5. Apparatus according to claim 2 wherein said hollow mold includes a first end of said first chamber and a second end of said second chamber, each and including a centrally located sealable orifice extending therethrough, with said first end being removable.

6. Apparatus according to claim 5 wherein said piston defines a first chamber between said piston and said first end, and a second chamber between said piston and said second and, wherein said piston is slidable in said space responsive to pressure changes in said first and second chambers;
   means for maintaining a predetermined pressure in said second chamber until a molten thermoplastic injected into said first chamber has cooled to form a substantially solidified plastic; and
   means for ejecting said solidified plastic from said hollow tube.

7. Apparatus according to claim 6 wherein said means for maintaining a predetermined pressure comprises:
   a supply of pressurized fluid communicating with said second chamber through the orifice in said second end, said pressurized fluid exerting pressure on said piston, and thereby exerting a pressure on said molten thermoplastic; and means for regulating the pressure of said pressurized fluid, whereby the predetermined pressure is maintained in said first chamber via the pressure exerted on said piston.

8. A method for the extrusion of rod-like thermoplastics which comprises:

providing a hollow mold having a pre-defined shape and defining a hollow space therein, said space formed by mold walls and opposing ends;

locating a reciprocable piston entirely within said space to separate said space into a first and second chamber, with said first chamber defining a mold cavity;

moving said piston in said space responsive to pressure changes in said first and second chambers to define variable sized first and second chambers between said piston and said opposing ends;

injecting a molten thermoplastic in said first chamber;

maintaining a predetermined pressure in said first chamber by moving said piston in said space until said molten thermoplastic has cooled to form a solidified thermoplastic; and ejecting said solidified thermoplastic from said first chamber.

9. Method according to claim 8 wherein the step of injecting a molten thermoplastic comprises:

providing a pressurized source of molten thermoplastic;

opening an orifice in said first chamber;

injecting said molten thermoplastic through said open orifice; and sealingly closing said open orifice.

10. Method according to claim 8 wherein the step of maintaining a predetermined pressure includes:

providing a supply of a pressurized fluid;

communicating said fluid into said second chamber through an orifice in one of said opposed ends, thereby applying pressure to said piston; and regulating the pressure of said fluid to maintain a predetermined pressure on said piston, end thereby maintain a predetermined pressure in said first chamber.

11. A method according to claim 8 wherein the step of maintaining a predetermined pressure includes:

providing a supply of a pressurized fluid;

opening an orifice to said second chamber in one of said opposed ends;

communicating said fluid through said open orifice to pre-pressurize said second chamber to compensate for shrinkage of the molten thermoplastic during cooling such that after cooling said first chamber will be pressurized to the predetermined pressure; and sealingly closing said open orifice.

12. A method according to claim 8 wherein said first end is removable; and wherein the step of ejecting comprises:

removing one of said opposed ends; and communicating pressurized fluid into said second chamber, thereby applying pressure on said piston against said solidified plastic and forcing said solidified plastic from said hollow mold.

* * * * *